US011314259B2

(12) United States Patent
Kang

(10) Patent No.: US 11,314,259 B2
(45) Date of Patent: Apr. 26, 2022

(54) VEHICLE AND METHOD OF CONTROLLING THE SAME

(71) Applicants: Hyundai Motor Company, Seoul (KR); Kia Motors Corporation, Seoul (KR)

(72) Inventor: TaeJun Kang, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 254 days.

(21) Appl. No.: 16/821,680

(22) Filed: Mar. 17, 2020

(65) Prior Publication Data

US 2021/0116927 A1    Apr. 22, 2021

(30) Foreign Application Priority Data

Oct. 16, 2019    (KR) .................. 10-2019-0128452

(51) Int. Cl.
*G05D 1/02*       (2020.01)
*G01C 21/34*      (2006.01)
(Continued)

(52) U.S. Cl.
CPC .......... *G05D 1/0217* (2013.01); *B60K 35/00* (2013.01); *B60L 15/20* (2013.01); *B60L 50/66* (2019.02); *B60L 58/12* (2019.02); *G01C 21/3469* (2013.01); *G01C 21/3679* (2013.01); *B60K 2370/166* (2019.05); *B60L 2240/642* (2013.01);
(Continued)

(58) Field of Classification Search
None
See application file for complete search history.

(56) References Cited

U.S. PATENT DOCUMENTS 10,288,439 B2 *    5/2019    Pedersen .............. G05D 1/0088
10,493,855 B2 *    12/2019   Chase .................... G06Q 20/14
(Continued)

OTHER PUBLICATIONS

Katsagyri et al., "Optimally Controlling Hybrid Electric Vehicles Using Path Forecasting", 2009 American Control Conference, Jun. 2009, pp. 4613-4617. (Year: 2009).*
(Continued)

*Primary Examiner* — Todd Melton
(74) *Attorney, Agent, or Firm* — Mintz Levin Cohn Ferris Glovsky and Popeo, P.C.; Peter F. Corless

(57) ABSTRACT

A vehicle is provided to output an optimal driving path. The vehicle includes a battery storing an electric energy and a storage storing a position of a vehicle return location and an electric vehicle fuel economy value for each road type. A communicator receives delivery information including position information of a destination, and external information including real-time traffic information, road information, real-time temperature information, or charging station information. A controller determines a driving path based on information, determines the electric energy required for driving on the driving path based on the road type and the electric vehicle fuel economy value for each road type, determines whether the vehicle is capable of driving on the driving path based on a battery SOC and the determined required electric energy, and determines a final path based on the presence of a ramp with a slope greater than a preset slope.

20 Claims, 5 Drawing Sheets

(51) Int. Cl.
G01C 21/36 (2006.01)
B60L 50/60 (2019.01)
B60L 58/12 (2019.01)
B60L 15/20 (2006.01)
B60K 35/00 (2006.01)

(52) U.S. Cl.
CPC ..... *B60L 2240/662* (2013.01); *B60L 2240/68* (2013.01)

(56) References Cited

U.S. PATENT DOCUMENTS

2018/0173219 A1* 6/2018 Lee .................. G05D 1/0088
2018/0299897 A1* 10/2018 Cashler ............ G05D 1/0088

OTHER PUBLICATIONS

Bozorgi et al., "A Time and Energy Efficient Routing Algorithm for Electric Vehicles Based on Historical Driving Data", IEEE Transactions on Intelligent Vehicles, vol. 2, Issue 4, Nov. 2017, pp. 308-320. (Year: 2017).*

* cited by examiner

VEHICLE AND METHOD OF CONTROLLING THE SAME

CROSS-REFERENCE TO RELATED APPLICATION(S)

This application is based on and claims priority under 35 U.S.C. § 119 to Korean Patent Application No. 10-2019-0128452, filed on Oct. 16, 2019, the disclosure of which is incorporated by reference in its entirety.

TECHNICAL FIELD

The present disclosure relates to a vehicle and a method of controlling the vehicle for logistics delivery that operates using an electric energy, and more particularly, to a vehicle that is driven on an optimal path for logistics delivery, and the method of controlling the vehicle.

BACKGROUND

Generally, vehicles are driven on roads or tracks to transport people, goods, or animals from one location to a next. Vehicles may be classified into three-wheel or four-wheel vehicles, a two-wheel vehicle such as a motorcycle, construction machinery, motor bicycles, bicycles, trains driving along rails on tracks, and the like.

In recent years, the development of electric vehicles that use an electric energy without using fossil fuels has expanded, and the electric vehicles are more economical in terms of fuel prices than internal combustion vehicles using fossil fuels. Therefore, although the electric vehicles are suitable for logistics delivery, a driving distance at a time of one-time charging is shorter than the driving distance of the internal combustion vehicle, and the driving distance is sensitive to external factors such as a temperature along an inclined road.

SUMMARY

An aspect of the disclosure is to provide a vehicle that provides an optimal path in consideration of position information of a destination, real-time traffic information, temperature information, and road information, and a method of controlling the vehicle. Additional aspects of the disclosure will be set forth in part in the description which follows and, in part, will be obvious from the description, or may be learned by practice of the disclosure.

In accordance with an aspect of the disclosure, a vehicle may include a battery configured to store an electric energy for driving the vehicle; a storage configured to store a position of a return location to which the vehicle should return and an electric vehicle fuel economy value for each road type; a communicator configured to receive delivery information including position information of a destination, and to receive external information including at least one of real-time traffic information, road information, real-time temperature information, or charging station information; and a controller configured to determine a driving path based on the position of the return location, the position information of the destination, and the real-time traffic information, to determine the electric energy required for driving in the driving path based on the road type on the determined driving path and the electric vehicle fuel economy value for each road type, to determine whether the vehicle is capable of driving in the driving path based on a state of charge (SOC) of the battery and the determined required electric energy, to determine a final path based on the presence or absence of a ramp above a preset slope on the driving path in response to determining that the vehicle is capable of being driven on the driving path; and to determine the final path such that the vehicle passes through a charging station in response to determining that the vehicle is unable to drive on the driving path.

In response to determining that the vehicle is capable of being driven on the driving path and there is no the ramp with a slope greater than the preset slope on the driving path, the controller may be configured to determine the driving path as the final path. In response to determining that the vehicle is capable of being driven on the driving path and there is the ramp with a slope greater than the preset slope on the driving path, the controller may be configured to determine a maximum output energy of the battery based on the SOC of the battery and the real-time temperature information, determine a minimum output energy for climbing the ramp based on a slope angle of the ramp, and determine the final path based on the maximum output energy of the battery and the minimum output energy for climbing the ramp.

The controller may be configured to determine the driving path as the final path when the maximum output energy of the battery is greater than the minimum output energy for climbing the ramp. Additionally, the controller may be configured to determine the final path such that the vehicle passes through a charging station when the maximum output energy of the battery is less than or equal to the minimum output energy for climbing the ramp.

The controller may be configured to determine the maximum output energy of the battery based on the number of cells of the battery, an output energy of the cell according to a temperature, and the SOC of the battery. The controller may further be configured to determine a priority of the plurality of charging stations based on charging speeds of the plurality of charging stations included in the charging station information, and determine the final path such that the vehicle passes through the charging station having higher priority.

Additionally, the controller may be configured to determine a priority of the plurality of charging stations based on positions of the plurality of charging stations included in the charging station information and the driving path, and to determine the final path such that the vehicle passes through the charging station having higher priority. The vehicle may further include a display configured to display the determined final path. The controller may be configured to determine an estimated charging time based on the required electric energy and the charging station information passing on the determined final path, and operate the display to display the determined estimated charging time.

In accordance with another aspect of the disclosure, a method of controlling a vehicle may include receiving, by a communicator, delivery information including position information of a destination and position information of a return location, and receiving, by the communicator, external information including at least one of real-time traffic information, road information, real-time temperature information, or charging station information; determining, by a controller, a driving path based on a position of the return location, the position information of the destination, and the real-time traffic information; determining, by the controller, an electric energy required for driving in the driving path based on the road type on the determined driving path and the electric vehicle fuel economy value for each road type, determining, by the controller, whether the vehicle is capable of driving in the driving path based on a state of charge (SOC) of the battery and the determined required electric energy; in response to determining that the vehicle is capable of being driven on the driving path, determining, by the controller, a final path based on the presence or absence of a ramp having a slope greater than a preset slope on the driving path; and in response to determining that the vehicle is unable to be driven on the driving path, determining, by the controller, the final path such that the vehicle passes through a charging station.

The determining of the final path based on the presence or absence of the ramp with a slope greater than the preset slope on the driving path may include determining the driving path as the final path when there is no ramp with a slope greater than the preset slope on the driving path and when there is a ramp with a slope greater than the preset slope, determining a maximum output energy of the battery based on the SOC of the battery and the real-time temperature information; determining a minimum output energy for climbing the ramp based on a slope angle of the ramp; and determining the final path based on the maximum output energy of the battery and the minimum output energy for climbing the ramp.

The determining of the final path based on the maximum output energy of the battery and the minimum output energy for climbing the ramp may include determining the driving path as the final path when the maximum output energy of the battery is greater than the minimum output energy for climbing the ramp. The determining of the final path based on the maximum output energy of the battery and the minimum output energy for climbing the ramp may further include determining the final path such that the vehicle passes through a charging station when the maximum output energy of the battery is less than or equal to the minimum output energy for climbing the ramp.

Additionally, the determining of the maximum output energy of the battery based on the SOC of the battery and the real-time temperature information may include determining the maximum output energy of the battery based on the number of cells of the battery, an output energy of the cell according to a temperature, and the SOC of the battery. The determining of the final path such that the vehicle passes through the charging station may include determining a priority of the plurality of charging stations based on charging speeds of the plurality of charging stations included in the charging station information; and determining the final path such that the vehicle passes through the charging station having higher priority.

The determining of the final path such that the vehicle passes through the charging station may include determining a priority of the plurality of charging stations based on positions of the plurality of charging stations included in the charging station information and the driving path; and determining the final path such that the vehicle passes through the charging station having higher priority. The method may further include displaying, by a display, the determined final path and determining, by the controller, an estimated charging time based on the required electric energy and the charging station information passing on the determined final path; and displaying, by a display, the determined estimated charging time.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
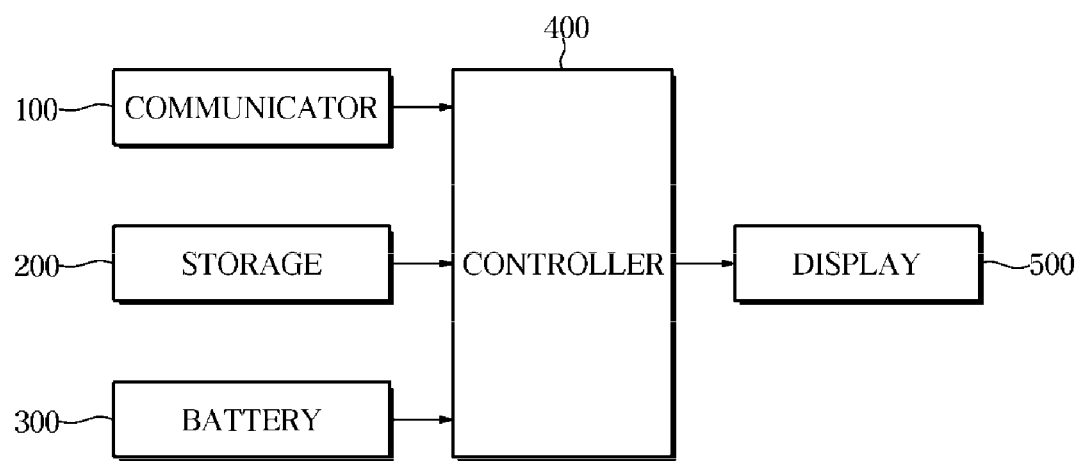
FIG. 1 is a block diagram illustrating a configuration of a vehicle according to exemplary embodiments of the disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The following description is merely exemplary in nature and is not intended to limit the present disclosure, application, or uses. It should be understood that throughout the drawings, corresponding reference numerals indicate like or corresponding parts and features.

Throughout this specification, when a certain part "includes" a certain component, it means that another component may be further included not excluding another component unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware.

However, the terms "part," "module," "unit," and the like are not limited to software or hardware. "Part," "module," "unit," and the like may be configured in a recording medium that can be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality. Hereinafter, the term "ramp" is not limited to a structure having a slope. Examples of the term "ramp" may also include a road or a path having a slope.

Hereinafter, a vehicle and a method of controlling the vehicle will be described in detail with reference to the accompanying drawings. In addition, parts irrelevant to description are omitted in the drawings in order to clearly explain some forms of the present disclosure.

FIG. 1 is a block diagram illustrating a configuration of a vehicle according to exemplary embodiments of the disclosure. Referring to FIG. 1, a vehicle according to an exemplary embodiment may include a communicator 100 configured to receive various types of information from an external server, a storage 200 configured to store various types of information for operating the vehicle, a battery 300 configured to store electric energy and provide the electric energy to a motor of the vehicle, a controller 400 configured to generate various control signals for operating components of the vehicle, and a display 500 configured to provide various types of information related to the vehicle to a user.

The communicator 100 (e.g., vehicle network terminal) may be configured to receive delivery information including position information of a destination from the external server, and receive external information including at least one of real-time traffic information, road information, real-time temperature information, or charging station information. Accordingly, the communicator 100 may include a controller area network (CAN) communication module, a wireless fidelity (WiFi) communication module, a universal serial bus (USB) communication module, and a Bluetooth communication module. In addition, the communicator 100 may further include a broadcasting communication module, such as transport protocol experts group (TPEG) of digital multimedia broadcasting (DMB), siriusXM (SXM), and radio data system (RDS).

The storage 200 may be configured to store a position of a return location to which the vehicle should return and an electric vehicle fuel economy value for each road type. The position of the return location and the electric vehicle fuel economy value for each road type may be received from the communicator 100, input by the user, or may be preset and stored when the vehicle is manufactured. In particular, the road type may be classified into a highway, a national road, a general city road, and the like, and the electric vehicle fuel economy value for each road type may be derived by testing the performance of the vehicle.

In addition, the return location may be set as a terminal of a delivery vehicle, such as a logistics terminal. Accordingly, the storage 200 may be implemented using at least one type of storage medium, such as a memory type (flash memory type), a hard disk type, a multimedia card micro type, a card type memory (for example, security digital (SD) or XD memory), a random access memory (RAM), a static random access memory (SRAM), a read-only memory (ROM), an electrically erasable programmable read-only memory (EE-PROM), a programmable read-only memory (PROM), a magnetic memory, a magnetic disk, and an optical disk.

The battery 300 may be configured to store the electric energy for driving the vehicle and may be configured to supply a driving energy to the motor. Accordingly, the battery 300 may be configured of a plurality of cells, and each of the plurality of cells may supply power to output energy. The output energy that each of the plurality of cells may output may vary based on a temperature and a state of charge (SOC).

In addition, the battery 300 may include a battery sensor configured to measure the SOC of the battery 300, and the battery sensor may be configured to transmit the measured SOC of the battery 300 to the controller 400. The controller 400 may be configured to determine a final path based on the position of the return location stored in the storage 200 and the delivery information and the external information received from the communicator 100. In addition, the controller 400 may be configured to generate and transmit a control signal to display the determined final path to the display 500. A detailed process of determining the final path by the controller 400 will be described later with reference to FIGS. 2 to 3.

The controller 400 may be implemented with the memory configured to store an algorithm to operate the components in the vehicle or data regarding a program that implements the algorithm, and the processor configured to execute the aforementioned operation using the data stored in the memory. The memory and the processor may be implemented in separate chips. Alternatively, the memory and the processor may be implemented in a single chip. In addition, the controller 400 may be configured to transmit a signal to an electronic control unit (ECU) or a terminal. In particularly, a signal may be transmitted using a CAN communication scheme.

The communicator 100, the storage 200, the battery 300, and the display 500 in some forms of the present disclosure may be configured to transmit a respective piece of information thereof to the controller 140 via the CAN communication. In other words, a communication network including a body network, a multimedia network, a chassis network, and the like is provided in the vehicle for operation of various electric loads mounted within the vehicle and communication between various electric loads. The separate networks may be connected to each other by the controller 400 to transmit and receive a CAN communication message therebetween.

The display 500 in some forms of the present disclosure may provide a user interface (UI) for providing a user with information related to a vehicle in the form of an image or text. For example, the display 150 may be configured to output and display the final path of the vehicle based on the control signal of the controller 400. In addition, the display 500 may be configured to display an estimated charging time that is an estimated time for charging the vehicle based on the control signal of the controller 400. Accordingly, the display 500 may be embedded in a center fascia. However, the installation example of the display 500 is not limited thereto, and the display 130 may be provided to be separated from the center fascia of the vehicle.

Particularly, the display 500 may be implemented as a liquid crystal display (LCD), a light emitting diode (LED), a plasma display panel (PDP), an organic light emitting diode (OLED), a cathode ray tube (CRT), or the like, but the implementation of the display 500 is not limited thereto. In the above, each component of the vehicle according to an exemplary embodiment has been described. Hereinafter, a process of determining the final path by the controller 400 will be described with reference to FIGS. 2 to 3.

Figure 2:
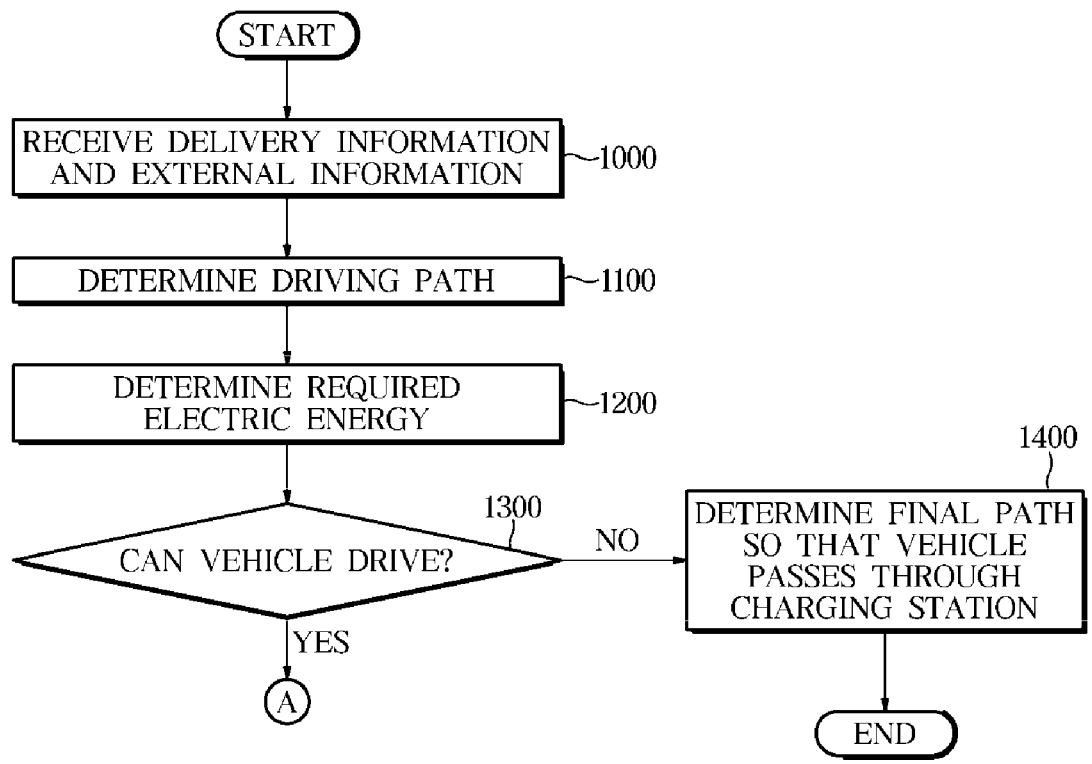
FIGS. 2 and 3 are flowcharts illustrating a method of controlling a vehicle according to exemplary embodiments of the disclosure.
Figure 3:
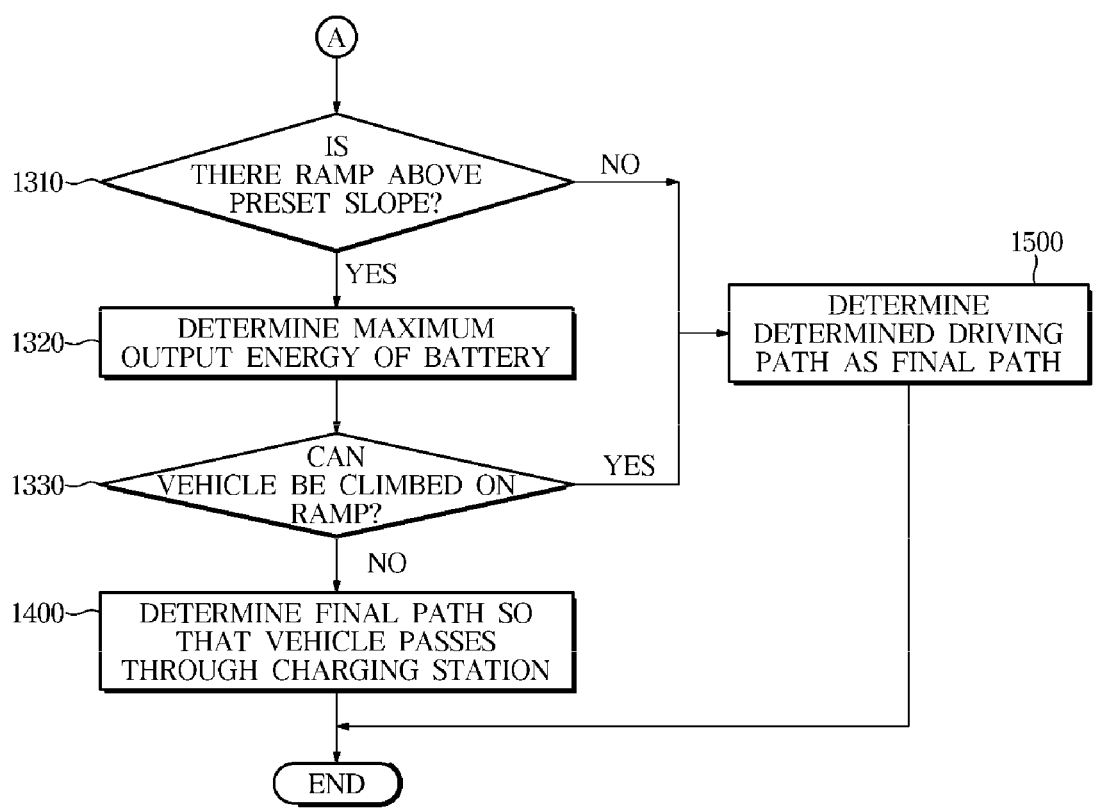

FIGS. 2 and 3 are flowcharts illustrating a method of controlling a vehicle according to exemplary embodiments of the disclosure. Referring to FIG. 2, the communicator 100 may be configured to receive the delivery information and the external information from the external server and transmit the delivery information and the external information to the controller 400 (1000). In particular, the delivery information may include information related to delivery, such as the position information of the destination, available time information, etc. The external information may include information such as the real-time traffic information, the road information, the real-time temperature information, and the charging station information.

The position information of the destination may include information regarding positions of a plurality of destinations that the vehicle must pass through. The available time information may include information regarding the time that is required to complete the delivery and return to the return location. The real-time traffic information may include information such as real-time traffic volume, a traffic speed. The real-time temperature information may include information regarding the temperature based on the position of a current vehicle. The road information may include information regarding the road type, the slope of the road that is positioned on a map. The charging station information may include information regarding the position of a plurality of charging stations positioned on the map and a charging speed for each of the plurality of charging stations.

The controller 400 may be configured to primarily determine a driving path based on the position of the return location stored in the storage 200, the position information of the destination transmitted from the communicator 100, and the real-time traffic information (1100). The destination may include the plurality of destinations, and the controller 400 may be configured to determine an optimal driving path for returning to the return location via the plurality of destinations based on the real-time traffic information. When the driving path is determined, the controller 400 may be configured to determine electric energy required for driving in the driving path based the road type on the determined driving path and the electric vehicle fuel economy value for each road type (1200). Particularly, the controller 400 may be configured to determine the required electric energy by considering only the road type regardless of whether a ramp exists on the driving path.

Thereafter, the controller 400 may be configured to determine whether the vehicle is capable of being driven on the driving path based on the SOC of the battery 300 and the determined required electric energy (1300). Particularly, the controller 400 may be configured to compare an available energy considering the SOC of the battery 300 with the required electric energy to determine whether the vehicle is capable of being driven the driving path. The available energy of the battery 300 may be determined a value obtained by multiplying a capacity of the battery 300, the SOC of the battery 300, and a voltage of the battery 300.

For example, the controller 400 may be configured to determine that the vehicle may be driven on the driving path when the available energy of the battery 300 is greater than a value obtained by multiplying the required electric energy by a preset safety factor. On the contrary, the controller 400 may be configured to determine that the vehicle is unable to be driven on the driving path when the available energy of the battery 300 is less than a value obtained by multiplying the required electric energy by the preset safety factor. The preset safety factor may be stored in the storage 200 to consider additional energy consumption values due to changes in road conditions and air conditioning. For example, considering a safety margin of about 10%, the safety factor may be set to about 1.1.

In response to determining that the vehicle is unable to be driven on the driving path (NO in 1300), the controller 400 may be configured to determine the final path so that the vehicle passes through the charging station (1400). At this time, the controller 400 may be configured to determine priorities of the plurality of charging stations based on the charging speeds of the plurality of charging stations included in the charging station information, and determine the final path so that the vehicle passes through the charging stations having higher priority. For example, the controller 400 may be configured to determine the priority in order of a 100 kW high-speed charging station, a 50 kW high-speed charging station, and a slow-speed charging station based on the charging speed of the charging station.

In addition, the controller 400 may be configured to determine the priority in order of the most accessible charging station in the driving path based on the position of the charging station and the determined driving path. For example, when the estimated time required for passing through a first charging station on the driving path is about 10 minutes and the estimated time required for passing through a second charging station on the driving path is about 5 minutes, the controller 400 may be configured to determine the priority in order of the second charging station and the first charging station.

Referring to FIG. 3, in response to determining that the vehicle is capable of being driven on the driving path (YES in 1300), the controller 400 may be configured to determine the final path based on the presence or absence of the ramp above a preset slope on the driving path. In particular, the ramp is a term opposite to a flat road, and may refer to the road with the slope (e.g., an inclined road). Particularly, the controller 400 may be configured to determine whether there is the ramp with a slope greater than the preset slope on the driving path (1310), and when there is no ramp with a slope greater than the preset slope on the driving path (No in 1310), the controller 400 may be configured to determine the driving path primarily determined as the final path (1500).

The ramp having a slope greater than the preset slope may refer to the ramp having a slope angle above a preset angle.

When the ramp is detected with a slope greater than the preset slope on the driving path (YES in 1310), the controller 400 may be configured to determine a maximum output energy of the battery 300 based on the SOC of the battery 300 and the real-time temperature information. (1320). In particular, the controller 400 may be configured to determine the maximum output energy of the battery 300 based on the number of cells of the battery 300, the output energy of the cell according to the temperature, and the SOC of the battery 300. For example, the controller 400 may be configured to determine the maximum output energy of the battery 300 as a value obtained by multiplying the output energy of the cell according to the temperature, the number of cells of the battery 300, and a SOC value.

The controller 400 may be configured to determine a minimum output energy for climbing the ramp (e.g., driving up the ramp) based on the slope angle of the ramp, and determine whether the vehicle is capable of being driven up the ramp based on the maximum output energy of the battery 300 and the minimum output energy for climbing the ramp (1330). Particularly, the controller 400 may be configured to determine that the vehicle may climb the ramp when the maximum output energy of the battery 300 is greater than a value obtained by multiplying the minimum output energy for climbing the ramp by the safety factor. On the contrary, the controller 400 may be configured to determine that the vehicle is unable to climb the ramp when the maximum output energy of the battery 300 is equal to or less than a value obtained by multiplying the minimum output energy for climbing the ramp by the safety factor.

The minimum output energy for climbing the ramp may be tested and derived in advance corresponding to the slope angle of the ramp, and the minimum output energy corresponding to the slope angle of the ramp may be stored in the storage 200. The safety factor may be determined by considering the additional energy consumption due to changes in road conditions and air conditioning temperatures.

When the maximum output energy of the battery 300 is greater than the minimum output energy for climbing the ramp (YES in 1330), the controller 400 may be configured to determine the primarily determined driving path as the final path (1500). When the maximum output energy of the battery 300 is less than or equal to the minimum output energy for climbing the ramp (NO in 1330), the controller 400 may be configured to determine the final path such that the vehicle passes through the charging station (1400).

As described above, even if the available energy of the battery 300 is greater than the required electric energy for driving in the driving path, by considering the presence or absence of the ramp on the driving path, it may be possible to provide the optimum driving path of the electric vehicle whose driving distance is sensitive to external factors.

Figure 4:
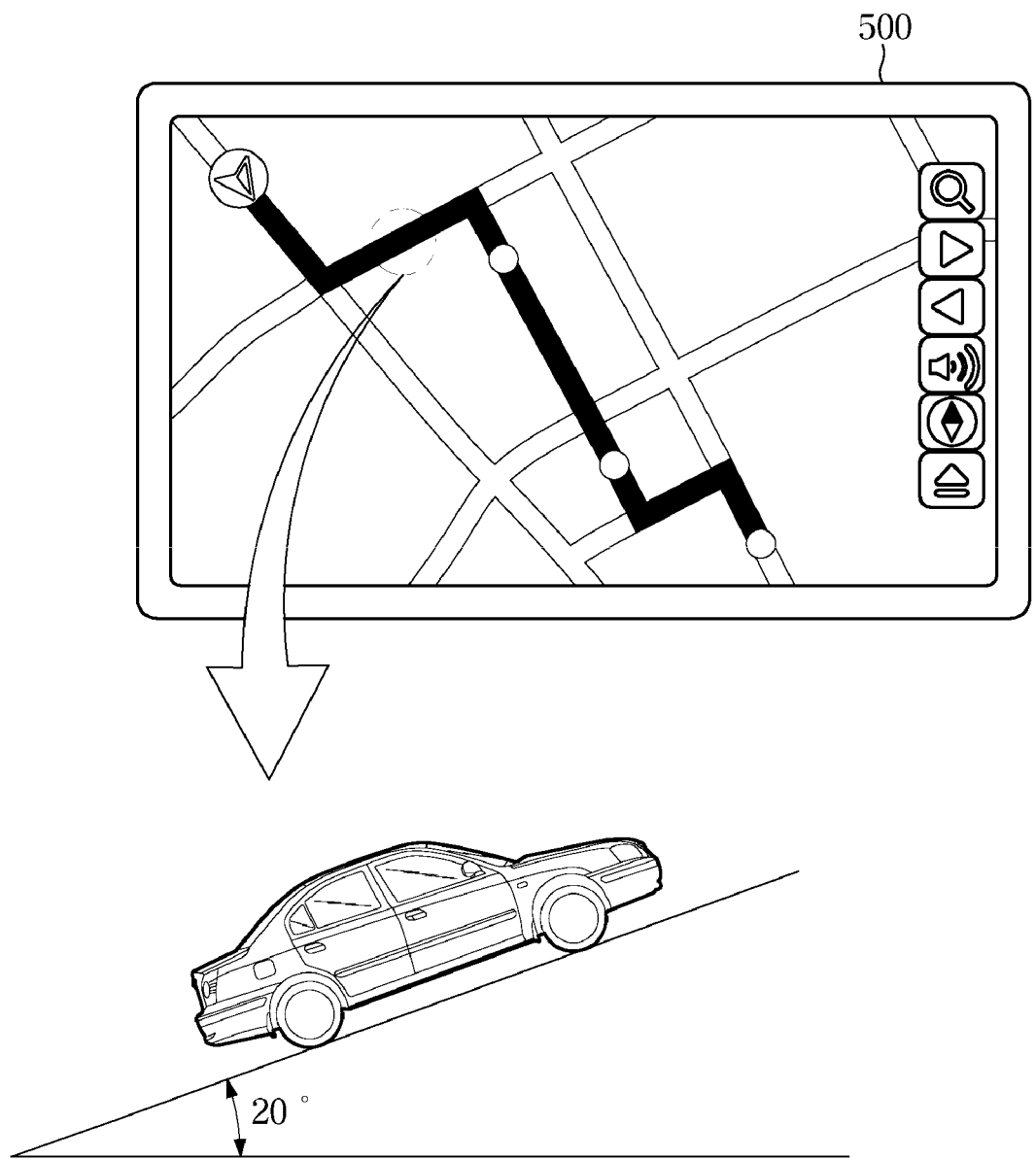
FIG. 4 is a view for describing a case in which a ramp exists on a driving path determined according to exemplary embodiments of the disclosure.

FIG. 4 is a view for describing a case in which a ramp exists on a driving path determined according to exemplary embodiments of the disclosure. FIG. 4 illustrates a ramp having the slope angle of 20 degrees on the driving path. For example, when a preset slope angle is about 10 degrees, the controller 400 may be configured to determine that there is the ramp with a slope greater than the preset slope on the driving path, and may be configured to determine the minimum output energy for climbing the ramp having the slope angle of about 20 degrees.

Thereafter, as described above, the controller 400 may be configured to determine the final path based on the maximum output energy of the battery 300 and the minimum output energy for climbing the ramp of 20 degrees. Although not illustrated in the drawing, the controller 400 may be configured to operate the display 500 to display the determined final path. The display 500 may provide a user with the final path determined according to the control signal of the controller 400.

Figure 5:
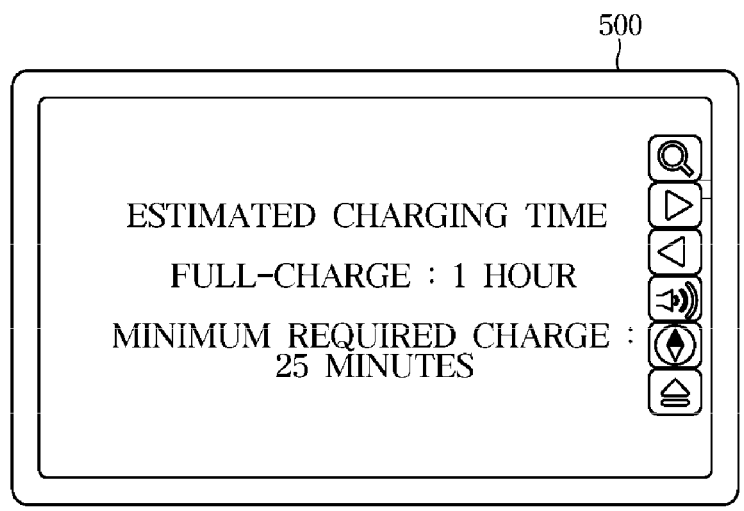
FIG. 5 is a view illustrating that a vehicle provides an estimated charging time according to exemplary embodiments of the disclosure.

FIG. 5 is a view illustrating that a vehicle provides an estimated charging time according to exemplary embodiments of the disclosure. Referring to FIG. 5, the controller 400 may be configured to determine the estimated charging time based on the required electric energy and the charging station information passing through the determined final path, and may be configured to operate the display 500 to display the determined estimated charging time.

In particular, the controller 400 may be configured to determine a minimum required charging time required for charging the battery 300 based on the required electric energy and the charging speed of the charging station passing through the final path. For example, when the required electric energy is determined to be about 25 kWh and the charging station is the 100 kW high-speed charging station, the controller 400 may be configured to determine the minimum required charging time as about 25 minutes. In addition, the controller 400 may be configured to determine a full-charge time, which is a time required to fully charge the battery 300, based on the SOC of the current battery 300, and may be configured to operate the display 500 to display the full-charge time.

As described above, the time required for delivery may be minimized by providing the user with the minimum charging time required until the vehicle returns to the return location via the plurality of destinations. Although the vehicle and the method of controlling the vehicle according to an exemplary embodiment have been described as all processes are performed in the vehicle, a person skilled in the art will understand that it may be implemented in one system.

In other words, an optimal path recommendation system for the electric vehicle may be configured to store the position of the return location to which the vehicle should return and the electric vehicle fuel economy value for each road type, and may be configured to receive the external information including the delivery information including the position information of the destination, the real-time traffic information, the road information, the real-time temperature information, and the charging station information. The optimal path recommendation system for the electric vehicle may include a server configured to generate the final path based on the position of the return location, the electric vehicle fuel economy value for each road type, the delivery information, and the external information, and transmits the generated final path to the vehicle. At this time, the vehicle may be configured to display the final path transmitted from the server on the display 500.

According to the vehicle and the method of controlling the vehicle according to the exemplary embodiments, it may be possible to solve the problem while using the electric vehicle for the logistics delivery, thereby enabling stable logistics delivery. Accordingly, it may be possible to minimize the waste of personnel for logistics delivery.

Exemplary embodiments of the disclosure have thus far been described with reference to the accompanying drawings. It will be obvious to those of ordinary skill in the art that the disclosure may be practiced in other forms than the embodiments as described above without changing the technical idea or essential features of the disclosure. The above exemplary embodiments are only by way of example, and should not be interpreted in a limited sense.

What is claimed is:

1. A vehicle, comprising:
   a battery configured to store an electric energy for driving the vehicle;
   a storage configured to store a position of a return location to which the vehicle should return and an electric vehicle fuel economy value for each road type;
   a communicator configured to receive delivery information including position information of a destination, and to receive external information including at least one of real-time traffic information, road information, real-time temperature information, or charging station information; and
   a controller configured to:
   determine a driving path based on the position of the return location, the position information of the destination, and the real-time traffic information;
   determine the electric energy required for driving in the driving path based on the road type on the determined driving path and the electric vehicle fuel economy value for each road type;
   determine whether the vehicle is capable of driving on the driving path based on a state of charge (SOC) of the battery and the determined required electric energy;
   in response to determining that the vehicle is capable of driving on the driving path, determine a final path based on the presence or absence of a ramp having a slope greater than a preset slope on the driving path; and
   in response to determining that the vehicle is not capable of driving on the driving path, determine the final path such that the vehicle passes through a charging station.

2. The vehicle according to claim 1, wherein, in response to determining that the vehicle is capable of driving on the driving path and there is no ramp with a slope greater than the preset slope on the driving path, the controller is configured to determine the driving path as the final path.

3. The vehicle according to claim 1, wherein, in response to determining that the vehicle is capable of driving on the driving path and there is the ramp with a slope greater than the preset slope on the driving path, the controller is configured to:
   determine a maximum output energy of the battery based on the SOC of the battery and the real-time temperature information;
   determine a minimum output energy for climbing the ramp based on a slope angle of the ramp; and
   determine the final path based on the maximum output energy of the battery and the minimum output energy for climbing the ramp.

4. The vehicle according to claim 3, wherein the controller is configured to determine the driving path as the final path when the maximum output energy of the battery is greater than the minimum output energy for climbing the ramp.

5. The vehicle according to claim 3, wherein the controller is configured to determine the final path such that the vehicle passes through a charging station when the maximum output energy of the battery is less than or equal to the minimum output energy for climbing the ramp.

6. The vehicle according to claim 3, wherein the controller is configured to determine the maximum output energy of the battery based on the number of cells of the battery, an output energy of the cell according to a temperature, and the SOC of the battery.

7. The vehicle according to claim 1, wherein the controller is configured to determine a priority of the plurality of charging stations based on charging speeds of the plurality of charging stations included in the charging station information, and to determine the final path such that the vehicle passes through the charging station having higher priority.

8. The vehicle according to claim 1, wherein the controller is configured to determine a priority of the plurality of charging stations based on positions of the plurality of charging stations included in the charging station information and the driving path, and determine the final path such that the vehicle passes through the charging station having higher priority.

9. The vehicle according to claim 1, further comprising:
   a display configured to display the determined final path.

10. The vehicle according to claim 9, wherein the controller is configured to determine an estimated charging time based on the required electric energy and the charging station information passing on the determined final path, and operate the display to display the determined estimated charging time.

11. A method of controlling a vehicle, comprising:
    receiving, by a communicator, delivery information including position information of a destination and position information of a return location;
    receiving, by the communicator, external information including at least one of real-time traffic information, road information, real-time temperature information, or charging station information;
    determining, by a controller, a driving path based on a position of the return location, the position information of the destination, and the real-time traffic information;
    determining, by the controller, an electric energy required for driving in the driving path based on the road type on the determined driving path and the electric vehicle fuel economy value for each road type;
    determining, by the controller, whether the vehicle is capable of driving on the driving path based on a state of charge (SOC) of the battery and the determined required electric energy;
    in response to determining that the vehicle is capable of driving on the driving path, determining, by the controller, a final path based on the presence or absence of a ramp having a slope greater than a preset slope on the driving path; and
    in response to determining that the vehicle is not capable of driving on the driving path, determining, by the controller, the final path such that the vehicle passes through a charging station.

12. The method according to claim 11, wherein the determining of the final path based on the presence or absence of the ramp having a slope greater than the preset slope on the driving path includes:
    determining the driving path as the final path when there is no ramp having a slope greater than the preset slope on the driving path.

13. The method according to claim 11, wherein the determining of the final path based on the presence or absence of the ramp having a slope greater than the preset slope on the driving path includes:
    in response to detecting the ramp with a slope greater than the preset slope on the driving path, determining a maximum output energy of the battery based on the SOC of the battery and the real-time temperature information;

determining a minimum output energy for climbing the ramp based on a slope angle of the ramp; and determining the final path based on the maximum output energy of the battery and the minimum output energy for climbing the ramp.

14. The method according to claim 13, wherein the determining of the final path based on the maximum output energy of the battery and the minimum output energy for climbing the ramp includes:

determining the driving path as the final path when the maximum output energy of the battery is greater than the minimum output energy for climbing the ramp.

15. The method according to claim 13, wherein the determining of the final path based on the maximum output energy of the battery and the minimum output energy for climbing the ramp includes:

determining the final path such that the vehicle passes through a charging station when the maximum output energy of the battery is less than or equal to the minimum output energy for climbing the ramp.

16. The method according to claim 13, wherein the determining of the maximum output energy of the battery based on the SOC of the battery and the real-time temperature information includes:

determining the maximum output energy of the battery based on the number of cells of the battery, an output energy of the cell according to a temperature, and the SOC of the battery.

17. The method according to claim 11, wherein the determining of the final path such that the vehicle passes through the charging station includes:

determining a priority of the plurality of charging stations based on charging speeds of the plurality of charging stations included in the charging station information; and determining the final path such that the vehicle passes through the charging station having higher priority.

18. The method according to claim 11, wherein the determining of the final path such that the vehicle passes through the charging station includes:

determining a priority of the plurality of charging stations based on positions of the plurality of charging stations included in the charging station information and the driving path; and determining the final path such that the vehicle passes through the charging station having higher priority.

19. The method according to claim 11, further comprising:

displaying, by a display operated by the controller, the determined final path.

20. The method according to claim 11, further comprising:

determining, by the controller, an estimated charging time based on the required electric energy and the charging station information passing on the determined final path; and operating, by the controller, a display to output the determined estimated charging time.

* * * * *